US008456456B2

(12) United States Patent
Huang et al.

(10) Patent No.: US 8,456,456 B2
(45) Date of Patent: Jun. 4, 2013

(54) DONGLE

(75) Inventors: Hsing-Wu Huang, Taipei (TW);
Kuo-Hsun Huang, Taipei (TW);
Chien-Jung Chen, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 537 days.

(21) Appl. No.: 12/823,099

(22) Filed: Jun. 24, 2010

(65) Prior Publication Data
US 2011/0007041 A1 Jan. 13, 2011

(30) Foreign Application Priority Data

Jul. 7, 2009 (TW) .............................. 98122905 A

(51) Int. Cl.
*G06F 3/038* (2006.01)
(52) U.S. Cl.
USPC ..................................... 345/204; 439/620.01
(58) Field of Classification Search
None
See application file for complete search history.

(56) References Cited

U.S. PATENT DOCUMENTS

| 7,069,454 | B1 * | 6/2006 | Cox ............................... 713/310 |
| 8,254,402 | B2 * | 8/2012 | Keady et al. .................. 370/419 |
| 2008/0007616 | A1 | 1/2008 | Baladhandayuthapani |
| 2008/0174595 | A1 | 7/2008 | Jatou |
| 2008/0246626 | A1 * | 10/2008 | Sheafor et al. ........... 340/825.21 |
| 2010/0042855 | A1 * | 2/2010 | Karam ......................... 713/310 |
| 2011/0003511 | A1 * | 1/2011 | Betts-LaCroix ......... 439/620.21 |

* cited by examiner

*Primary Examiner* — Jason Olson
(74) *Attorney, Agent, or Firm* — CKC & Partners Co., Ltd.

(57) ABSTRACT

A dongle for coupling a signal source device and a signal sink device is disclosed. The dongle includes an interface receptacle, a display port interface plug, a repeater, a low-dropout regulator and an impedance unit. The interface receptacle is a DVI receptacle or a HDMI receptacle. The repeater is electrically connected between the interface receptacle and the display port interface plug to enhance signals. The low-dropout regulator includes a power input end and a power output end. The power input end is electrically connected to the interface receptacle, and the power output end is electrically connected to the display port interface plug. The impedance unit is electrically connected between the power output end of the low-dropout regulator and the interface receptacle. The signal source device may output the display port signal needed by the signal sink device according to the function of the dongle.

20 Claims, 2 Drawing Sheets

DONGLE

BACKGROUND OF THE INVENTION

1. Field of the Invention

The invention relates to a dongle and, more particularly, to a dongle which may transmit signals with a display port interface transmitting specification via the digital visual interface (DVI) or a high-definition multimedia interface (HDMI).

2. Description of the Related Art

Generally, in current digital audio and video players, a high-speed digital audio and video signal transmitting specification is the main trend of the signal transmitting specification of the transmit interface, such as the high-definition multimedia interface (HDMI) transmitting specification, the digital visual interface (DVI) transmitting specification and the display port (DP) interface transmitting specification. Conventionally, to support multiple interface transmitting specifications in a signal source device, interface plugs corresponding to each transmission interface are usually disposed on the signal source device. Therefore, the amount of the interface plugs and the area for disposing the interface plugs are increased. As a result, various dongles, such as the DP to DVI dongle, the DP to HDMI dongle and the DVI to HDMI dongle are provided to reduce the amount of the interface plugs. However, since the dongles perform interface processing mainly according to signal formats conversion operation, the circuit architectures are rather difficult.

In addition, since the signal transmission way of the DP interface is American National Standards Institute (ANSI) 8B/10B, which is similar to the network packet transmission way and different from transition minimized differential signaling (TMDS) transmission way used by the DVI and HDMI. Therefore, the DP interface uses less wires to achieve the higher transmission bandwidth (such as 10 Gbps), and the display panel with the DP interface becomes more popular. However, since there are no DVI to DP dongle and the HDMI to DP dongle, the signal with the display port interface transmitting specification cannot be transmitted by the DVI or HDMI without transforming the signal format.

BRIEF SUMMARY OF THE INVENTION

The invention discloses a dongle which may transmit signals with a display port interface transmitting specification via the DVI or the HDMI.

The dongle includes an interface receptacle, a display port interface plug, a repeater, a low-dropout regulator and an impedance unit. The repeater is electrically connected between the interface receptacle and the display port interface plug for enhancing the signals. The low-dropout regulator includes a power input end and a power output end. The power input end is electrically connected to the interface receptacle, and the power output end is electrically connected to the display port interface plug. The impedance unit is electrically connected between the power output end of the low-dropout regulator and the interface receptacle.

The invention also discloses a dongle which may transmit signal with the display port interface transmitting specification via the DVI and HDMI. The dongle includes an interface receptacle, a display port interface plug, a first coupling unit, a low-dropout regulator and an impedance unit. The first coupling unit is electrically connected between the interface receptacle and the display port interface plug for transmitting data signal inputted from the interface receptacle to the display port interface plug. The low-dropout regulator includes a power input end and a power output end. The power input end is electrically connected to the interface receptacle, and the power output end is electrically connected to the display port interface plug. The impedance unit is electrically connected between the power output end of the low-dropout regulator and the interface receptacle.

DETAILED DESCRIPTION OF THE EMBODIMENTS

Figure 1:
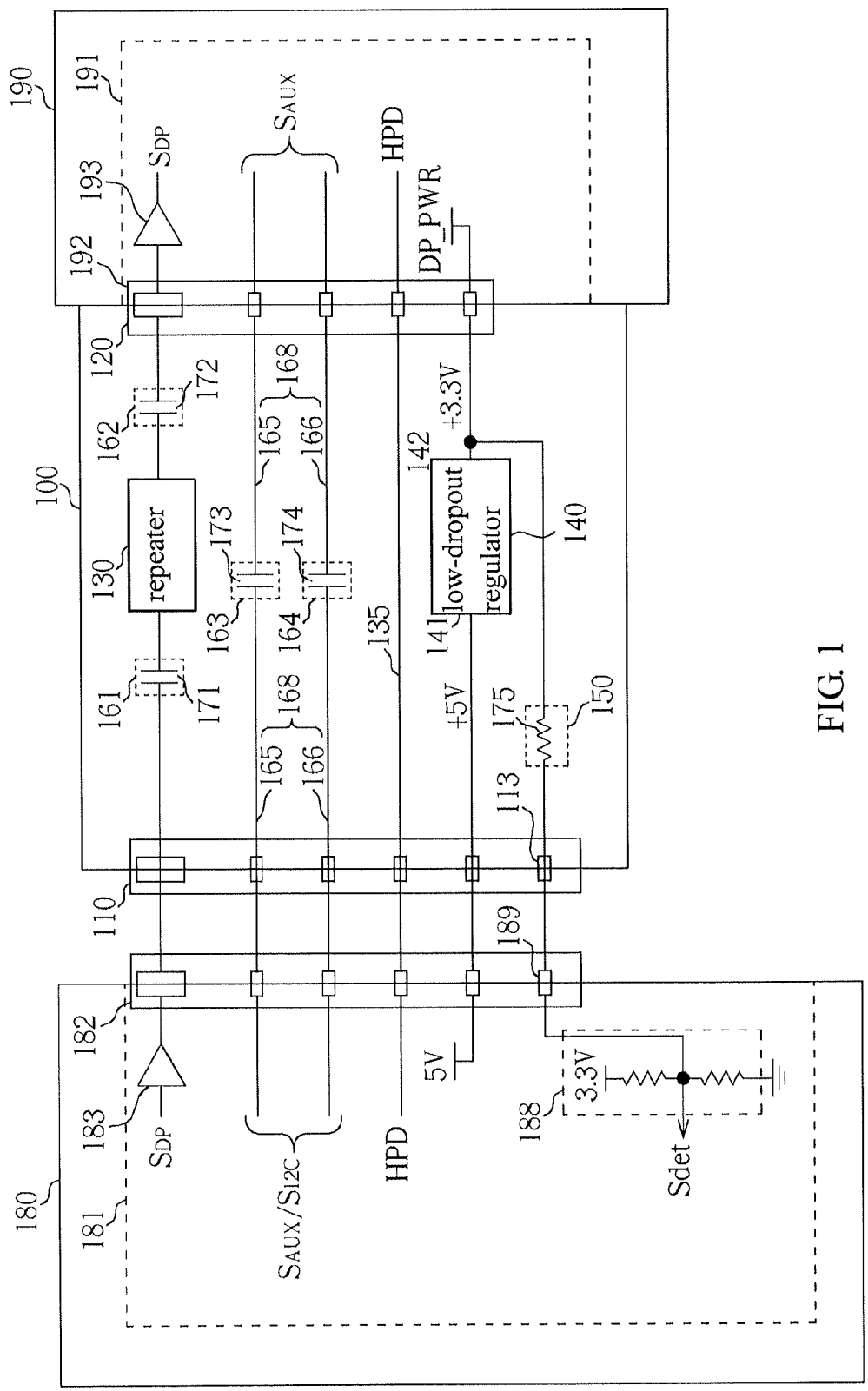
FIG. 1 is a schematic diagram showing the circuit of the dongle in the first embodiment of the invention.

FIG. 1 is a schematic diagram showing the circuit of a dongle 100 in the first embodiment of the invention. As shown in FIG. 1, the dongle 100 includes an interface receptacle 110, a display port interface plug 120, a repeater 130, a wire 135, a low-dropout regulator 140, an impedance unit 150 and multiple coupling units 161 to 164. The dongle 100 is coupled between a signal source device 180 a the signal sink device 190 to allow the signal source device 180 to output a display port signal $S_{DP}$ needed by the signal sink device 190 according to the function of the dongle 100. The signal source device 180 may be a computer host or a multi-function digital versatile disk (DVD) player, and the signal sink device 190 may be a liquid crystal display (LCD) device. The interface receptacle 110 is a DVI receptacle or a HDMI receptacle.

The coupling unit 161 is electrically connected between the interface receptacle 110 and the repeater 130 for transmitting the display port signal $S_{DP}$ inputted from the interface receptacle 110 to the repeater 130. The coupling unit 162 is electrically connected to the repeater 130 and the display port interface plug 120 for transmitting the display port signal $S_{DP}$ outputted from the repeater 130 to the display port interface plug 120. The repeater 130 is electrically connected to the coupling unit 161 and the coupling unit 162 for enhancing the signal, thereby avoiding the attenuation of the transmitted display port signal $S_{DP}$. The coupling unit 163 is electrically connected between the interface receptacle 110 and the display port interface plug 120 via the auxiliary transmitting line 165, and the coupling unit 164 is electrically connected between the interface receptacle 110 and the display port interface plug 120 via the auxiliary transmitting line 166. The auxiliary channel 168 provided by the auxiliary transmitting lines 165 and 166 is used to transmit the auxiliary differential signal $S_{AUX}$ to perform the synchronous signal transmission. The wire 135 is electrically connected between the interface receptacle 110 and the display port interface plug 120 for transmitting the hot-plug detect (HPD) signal.

The low-dropout regulator 140 includes a power input end 141 and a power output end 142. The power input end 141 is electrically connected to the interface receptacle 110, and the power output end 142 is electrically connected to the display port interface plug 120 for providing power DP_PWR needed by the display port input interface 191 of the signal sink device 190. The low-dropout regulator 140 also may provide power for the repeater 130 to enhance signals. That is, the power output end 142 of the low-dropout regulator 140 also may be electrically connected to the power supply end (not shown) of the repeater 130. The low-dropout regulator 140 may be 5V-to-3.3V voltage regulator, and it is used to transform 5V voltage source to 3.3V voltage source. The impedance unit 150 is electrically connected between the power output end 142 of the low-dropout regulator 140 and the interface receptacle 110. Detailedly, the impedance unit 150 is electrically connected to a ground/shield pin 113 of the interface receptacle 110, such as the ground/shield pin of the DVI receptacle or the ground/shield pin of the HDMI receptacle. In an embodiment, when the interface receptacle 110 is the DVI receptacle, the ground/shield pin 113 may be the third pin (the shield pin) of the DVI receptacle. The signal source device 180 includes a detecting signal generating unit 188, and it may be coupled to the ground/shield pin 113 and generate the detecting signal $S_{det}$. In other words, in the interface receptacle 182 of the signal source device 180, the pin 189 for coupling to the ground/shield pin 113 is not directly coupled to the ground, and it is electrically connected to the detecting signal generating unit 188. The impedance of the impedance unit 150 may be set according to the circuit architecture of the detecting signal generating unit 188. Taking the circuit architecture of the detecting signal generating unit 188 in FIG. 1 as an example, the impedance of the impedance unit 150 may be set to be zero. In the embodiment in FIG. 1, the coupling unit 161 includes a capacitor 171, the coupling unit 162 includes a capacitor 172, the coupling unit 163 includes a capacitor 173, the coupling unit 164 includes a capacitor 174, and the impedance unit 150 includes a resistor 175.

If the interface receptacle 110 is the DVI receptacle, the signal source device 180 is used to output signals with the DVI transmitting specification or signals with the display port interface transmitting specification. The interface receptacle 182 included in the output interface 181 of the signal source device 180 is the DVI receptacle. If the interface receptacle 110 is the HDMI receptacle, the signal source device 180 is used to output signals with HDMI transmitting specification or the display port interface specification, and the interface receptacle 182 included in the output interface 181 of the signal source device 180 is the HDMI receptacle. In addition, since the signal sink device 190 is used to receive the signals with display port interface transmitting specification, the display port input interface 191 includes the display port interface receptacle 192. The relating functions of the circuits in the dongle 100 are illustrated hereinbelow.

When the signal sink device 190 is connected to the signal source device 180 via the dongle 100, the low-dropout regulator 140 converts the 5V voltage source provided by the signal source device 180 to 3.3V voltage source and feeds the 3.3V voltage source in the display port input interface 191 of the signal sink device 190, thereby allowing the signal sink device 190 to transmit the 3.3V hot-plug detect (HPD) signal to the signal source device 180. The signal source device 180 then detects the connected signal sink device 190. The 3.3V voltage source also may be fed to the detecting signal generating unit 188 via the impedance unit 150 and the ground/shield pin 113 for generating the 3.3V detecting signal $S_{det}$. Afterwards, the signal source device 180 provides the display port signal $S_{DP}$ and the auxiliary differential signal $S_{AUX}$ with the display port interface transmitting specification according to the detecting signal $S_{det}$. The display port signal $S_{DP}$ is fed to the receiver 193 of the display port input interface 191 of the signal sink device 190 via the transmitter 183 of the output interface 181 and the repeater 130 of the dongle 100. The auxiliary differential signal $S_{AUX}$ is transmitted to the signal sink device 190 via the auxiliary channel 168 provided by the auxiliary transmitting lines 165 and 166 and via the coupling units 163 and 164. That is, the signal with the display port interface transmitting specification may be transmitted via the DVI and HDMI according to the function of the dongle 100.

In another circuit function operation, when the signal sink device 190 is connected to the signal source device 180 via the dongle 100, the signal source device 180 first transmits the inter-integrated circuit (I2C) signal $S_{I2C}$ to the signal sink device 190 via the auxiliary channel. However, the signal sink device 190 transmits the auxiliary differential signal $S_{AUX}$ back to the signal source device 180. When the signal source device 180 detects the auxiliary differential signal $S_{AUX}$ transmitted by the signal sink device 190, it provides the display port signal $S_{DP}$ and the auxiliary differential signal $S_{AUX}$ with the display port interface transmitting specification and transmits the signals to the signal sink device 190 via the dongle 100. Consequently, the signal with the display port interface transmitting specification is transmitted via the DVI and HDMI. In the circuit function operation, the signal source device 180 is not according to the detecting signal $S_{DET}$ to transmit the signal with the display port interface transmitting specification via the DVI or the HDMI. Therefore, the signal source device 180 may not have the detecting signal generating unit 188, and the pin 189 can be directly connected to the ground.

Figure 2:
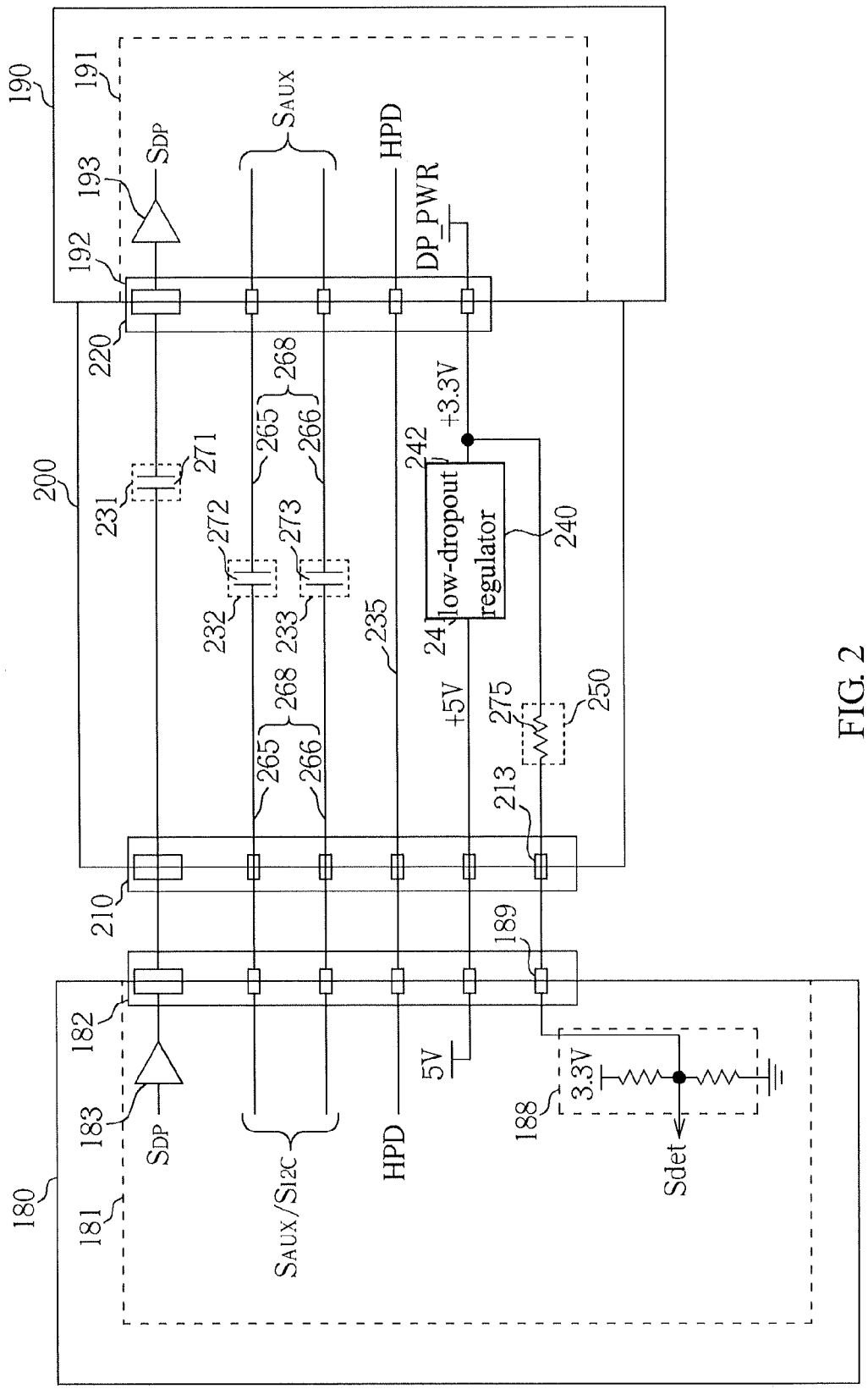
FIG. 2 is a schematic diagram showing the circuit of the dongle in the second embodiment of the invention.

FIG. 2 is a schematic diagram showing the circuit of the dongle 200 in the second embodiment of the invention. As shown in FIG. 2, the dongle 200 includes an interface receptacle 210, a display port interface plug 220, multiple coupling units 231 to 233, a wire 235, a low-dropout regulator 240 and an impedance unit 250. The dongle 200 is coupled to the signal source device 180 and the signal sink device 190 to allow the signal source device 180 to output the display port signal $S_{DP}$ needed by the signal sink device 190 according to the function of the dongle 200. The interface receptacle 210 may be a DVI receptacle or a HDMI receptacle.

The coupling unit 231 is electrically connected between the interface receptacle 210 and the display port interface plug 220 for transmitting the display port signal $S_{DP}$ inputted from the interface receptacle 210 to the display port interface plug 220. The circuit architecture of the dongle 200 is preferably used to transmit the display port signal $S_{DP}$ with better quality. Therefore, the repeater for enhancing the signal is not needed to reduce the cost. The coupling unit 232 is electrically connected between the interface receptacle 210 and the display port interface plug 220 via the auxiliary transmitting line 265, and the coupling unit 233 is electrically connected between the interface receptacle 210 and the display port interface plug 220 via the auxiliary transmitting line 266. The auxiliary channel 268 provided by the auxiliary transmitting lines 265 and 266 is used to transmit the auxiliary differential signal $S_{AUX}$ to perform the synchronous signal transmission. The wire 235 is electrically connected between the interface receptacle 210 and the display port interface plug 220 for transmitting the hot-plug detect signal HPD.

The low-dropout regulator 240 includes a power input end 241 and a power output end 242. The power input end 241 is electrically connected to the interface receptacle 210, and the power output end 242 is electrically connected to the display port interface plug 220 for providing the power DP_PWR needed by the display port input interface 191 of the signal sink device 190. The low-dropout regulator 240 may be 5V-to-3.3V voltage regulator for transforming the 5V voltage from the signal source device 180 to the 3.3V voltage. The impedance unit 250 is electrically connected between the power output end 242 and the interface receptacle 210. Detailedly, the impedance unit 250 is electrically connected to a ground/shield pin 213 of the interface receptacle 210 such as the ground/shield pin of the DVI receptacle or the ground/shield pin of the HDMI receptacle. In an embodiment, when the interface receptacle 210 is the DVI receptacle, the ground/ shield pin 213 may be the third pin (the shield pin) of the DVI receptacle, and the impedance of the impedance unit 250 may be set according to the circuit architecture of the detecting signal generating unit 188. Taking the circuit architecture of the detecting signal generating unit 188 in FIG. 2 as an example, the impedance of the impedance unit 250 may be set to be zero. In the embodiment shown in FIG. 2, the coupling unit 231 includes a capacitor 271, the coupling unit 232 includes a capacitor 272, the coupling unit 233 includes a capacitor 273, and the impedance unit 250 includes a resistor 275.

Similarly, if the interface receptacle 210 is a DVI receptacle, the signal source device 180 is used to output signal with the DVI transmitting specification or the signal with the display port interface transmitting specification. The interface receptacle 182 included in the output interface 181 of the signal source device 180 is the DVI receptacle. If the interface receptacle 210 is the HDMI receptacle, the signal source device 180 is used to output signal with the HDMI transmitting specification or the signal with the display port interface transmitting specification. The interface receptacle 182 included in the output interface 181 of the signal source device 180 is the HDMI receptacle. In addition, since the signal sink device 190 is used to receive the signal with the display port interface transmitting specification, the display port input interface 191 includes the display port interface plug 192. The relating functions of the circuit in the dongle are shown hereinbelow.

When the signal sink device 190 is connected to the signal source device 180 via the dongle 200, the low-dropout regulator 240 may transform the 5V voltage provided by the signal source device 180 to 3.3V voltage and feeds the 3.3V voltage in the display port input interface 191 of the signal sink device 190, thereby allowing the signal sink device 190 to transmit the 3.3V hot-plug detect signal HPD to the signal source device 180. The signal source device 180 then detects the connected signal sink device 190. At the same time, the 3.3V voltage source also may be fed to the detecting signal generating unit 188 via the impedance unit 250 and the ground/shield pin 213 to generate the 3.3V detecting signal $S_{det}$. Afterwards, the signal source device 180 provides the display port signal $S_{DP}$ and the auxiliary differential signal $S_{AUX}$ with the display port interface transmitting specification according to the detecting signal $S_{det}$. The display port signal $S_{DP}$ is fed to receiver 193 of the display port input interface 191 of the signal sink device 190 via the transmitter 183 of the output interface 181 and the coupling unit 231 of the dongle 200. The auxiliary differential signal $S_{AUX}$ is transmitted to the signal sink device 190 via the auxiliary channel 268 provided by the auxiliary transmitting lines 265 and 266 and via the coupling units 232 and 233. That is, the signal with the display port interface transmitting specification is transmitted via the DVI or HDMI according to the function of the dongle 200.

In another circuit function operation, when the signal sink device 190 is connected to the signal source device 180 via the dongle 200, the signal source device 180 first transmits the I2C signal $S_{I2C}$ to the signal sink device 190 via the auxiliary channel. However, the signal sink device 190 transmits the auxiliary differential signal $S_{AUX}$ back to the signal source device 180. When the signal source device 180 detects the auxiliary differential signal $S_{AUX}$ transmitted by the signal sink device 190, it provides the display port signal $S_{DP}$ and the auxiliary differential signal $S_{AUX}$ with the display port interface transmitting specification and transmits them to the signal sink device 190 via the dongle 200. Consequently, the signal with the display port interface transmitting specification is transmitted via the DVI or HDMI. In the similar way, based on the circuit architecture, the signal source device 180 may not have the detecting signal generating unit 188, and the pin 189 may be directly connected to the ground.

To sum up, the dongle in the invention may directly transmit the signals with the display port interface transmitting specification to the signal sink device via the DVI or the HDMI of the signal source device. Therefore, the DVI and HDMI may be used more flexibly. In addition, the dongle in the invention does not need any signal specification transforming circuit. Thus, the complexity of the circuit architecture is simplified, and the cost is reduced.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. A dongle comprising:
   an interface receptacle;
   a display port interface plug;
   a repeater electrically connected between the interface receptacle and the display port interface plug for enhancing signals;
   a low-dropout regulator including a power input end and a power output end, wherein the power input end is electrically connected to the interface receptacle, and the power output end is electrically connected to the display port interface plug; and
   an impedance unit electrically connected between the power output end of the low-dropout regulator and the interface receptacle.

2. The dongle according to claim 1, wherein the interface receptacle is a digital visual interface (DVI) receptacle or a high definition multimedia interface (HDMI) receptacle.

3. The dongle according to claim 1, wherein the impedance unit is electrically connected to a ground pin or a shield pin of the interface receptacle.

4. The dongle according to claim 1, wherein the impedance unit comprises a resistor.

5. The dongle according to claim 1, further comprising:
   a first coupling unit electrically connected between the interface receptacle and the repeater for transmitting data signal inputted from the interface receptacle to the repeater; and
   a second coupling unit electrically connected between the repeater and the display port interface plug for transmitting the data signal outputted from the repeater to the display port interface plug.

6. The dongle according to claim 5, wherein the first coupling unit comprises a first capacitor, and the second coupling unit comprises a second capacitor.

7. The dongle according to claim 1, further comprising:
   a first coupling unit electrically connected between the interface receptacle and the display port interface plug; and
   a second coupling unit electrically connected between the interface receptacle and the display port interface plug;
   wherein the first coupling unit and the second coupling unit are used to transmit an auxiliary differential signal or an inter-integrated circuit (I2C) signal inputted from the interface receptacle to the display port interface plug or transmit the auxiliary differential signal inputted from the display port interface plug to the interface receptacle.

8. The dongle according to claim 7, wherein the first coupling unit comprises a first capacitor and the second coupling unit comprises a second capacitor.

9. The dongle according to claim 1, further comprising:
a wire electrically connected between the interface receptacle and the display port interface plug for transmitting a hot-plug detect signal.

10. The dongle according to claim 1, wherein the low-dropout regulator is a 5 volts-to-3.3 volts regulator.

11. The dongle according to claim 1, wherein the power supply end of the repeater is electrically connected to the power output end of the low-dropout regulator.

12. A dongle comprising:
an interface receptacle;
a display port interface plug;
a first coupling unit electrically connected between the interface receptacle and the display port interface plug for transmitting data signal inputted from the interface receptacle to the display port interface plug;
a low-dropout regulator including a power input end and a power output end, wherein the power input end is electrically connected to the interface receptacle, and the power output end is electrically connected to the display port interface plug; and
an impedance unit electrically connected between the power output end of the low-dropout regulator and the interface receptacle.

13. The dongle according to claim 12, wherein the interface receptacle is a DVI receptacle or a HDMI receptacle.

14. The dongle according to claim 12, wherein the impedance unit is electrically connected to a ground pin or a shield pin of the interface receptacle.

15. The dongle according to claim 12, wherein the impedance unit comprises a resistor.

16. The dongle according to claim 12, wherein the first coupling unit comprises a capacitor.

17. The dongle according to claim 12, further comprising:
a second coupling unit electrically connected between the interface receptacle and the display port interface plug; and
a third coupling unit electrically connected between the interface receptacle and the display port interface plug;
wherein the second coupling unit and the third coupling unit are used to transmit an auxiliary differential signal or an I2C signal inputted from the interface receptacle to the display port interface plug or transmit the auxiliary differential signal inputted from the display port interface plug to the interface receptacle.

18. The dongle according to claim 17, wherein the second coupling unit comprises a first capacitor, and the third coupling unit comprises a second capacitor.

19. The dongle according to claim 12, further comprising:
a wire electrically connected between the interface receptacle and the display port interface plug for transmitting a hot-plug detect signal.

20. The dongle according to claim 12, wherein the low-dropout regulator is a 5 volts-to-3.3 volts regulator.

* * * * *